United States Patent [19]

Chou

[11] Patent Number: 5,583,761
[45] Date of Patent: Dec. 10, 1996

[54] METHOD FOR AUTOMATIC DISPLAYING PROGRAM PRESENTATIONS IN DIFFERENT LANGUAGES

[75] Inventor: Henwell H. Chou, West Hartford, Conn.

[73] Assignee: KT International, Inc., East Hartford, Conn.

[21] Appl. No.: 136,573

[22] Filed: Oct. 13, 1993

[51] Int. Cl.⁶ .................................................. G06F 17/28
[52] U.S. Cl. ........................ 395/798; 395/701; 395/752; 395/326
[58] Field of Search ................. 364/419.08, 419.15, 364/419.02, 419.16; 395/600, 650, 156, 700, 500; 340/786

[56] References Cited

U.S. PATENT DOCUMENTS

| | | | |
|---|---|---|---|
| 4,593,356 | 6/1986 | Hashimoto et al. | 364/419 |
| 4,731,735 | 3/1988 | Borgendale et al. | 364/200 |
| 5,157,384 | 10/1992 | Greanias et al. | 340/706 |
| 5,204,947 | 4/1993 | Bernstein et al. | 395/157 |
| 5,251,130 | 10/1993 | Andrews et al. | 364/419.03 |
| 5,276,616 | 1/1994 | Kuga | 364/419.08 |
| 5,291,601 | 3/1994 | Sands | 395/700 |
| 5,428,782 | 6/1995 | White | 395/650 |

OTHER PUBLICATIONS

DIALOG File 275, Acc. #01523422: "Buffered Input & Output of MIDI Short Messages", Charles Petzold, *PC Magazine*, vol. 11, No. 14, p. 488, Aug. 1992.

DIALOG File 275, Acc #01254689: ".EXE Files, 05–2 Style", David A. Schmitt; *PC Tech Journal*, vol. 6, No. 11, p. 76, Nov. 1988.

William S. Hall: "Adapt Your Program for Worldwise Use with Windows™ Internationalization Support", Microsoft Sys. Journ., Nov./Dec. 1991, pp. 29–45.

Apple Computer, Inc.: MacIntosh Human Interface Guidelines, published 1992 by Addison-Wesley Publishing Co, pp. 15–25 & 230.

*Primary Examiner*—Robert A. Weinhardt
*Assistant Examiner*—Joseph Thomas
*Attorney, Agent, or Firm*—Jerry Cohen; Edwin H. Paul; Stephen Y. Chow

[57] ABSTRACT

The present invention, called the Application Program Language Translator (APLT), is a method that allows application programs, performing user interfacing, to be presented/displayed in part or in whole in any language in real-time as selected by the user. In a preferred embodiment the invention comprises two processes, the Learn process and the Run process. The Learn process constructs an application specific translation table (ASTT) specifically for the target application. The Run process utilizes the ASTT during the execution of the target application and performs actual translation for the displays. Application programs can utilize graphic user interface (GUI) on graphical operating system platforms, Such as OS/2, Windows and Unix, running on personal computers (PCs) or workstations. Application programs can be a text based application running in a pure text mode operating system platform, such as DOS, OS/2 and UNIX. The most commonly used language for the presentation from these application programs is English. The target GUI application programs are software programs designed and implemented on a graphical platform utilizing a message driven approach and an operating system providing screen painting facility, such as Presentation Manager™ (PM™) running on OS/2™, which are IBM Trademarks for widely available software. The target test application programs are also software programs designed on a text platform and having a finite number of formatted screens. The present invention runs in multiprocessing, networked, and client/server environments.

15 Claims, 9 Drawing Sheets

SCREEN CAPTURE

SCREEN. CAP

SCREEN INDEX LIBRARY

| X | Y | L | STRING | INDEX |
|---|---|---|--------|-------|
| 60 | 23 | 8 | SCREEN 1 | 1 |
| 58 | 23 | 8 | SCREEN 2 | 34 |
| 60 | 20 | 8 | SCREEN 3 | 78 |
|  |  |  |  |  |

SCREEN. IDX

ORIGINAL STRING LIBRARY

| X | Y | L | STRING |
|---|---|---|---|
| 1 | 5 | 10 | "STRING 1" |
| 42 | 15 | 20 | "STRING 36" |
| 1 | 23 | 15 | "STRING 83" |
| | | | |

— INDEX 1
— INDEX 2
— INDEX 3

↑ TEXT
↑ SCREEN IDENTIFICATION

TEXT TO BE TRANSLATED

FIG. 8C

TARGET STRING LIBRARY

| X | Y | L | STRING |
|---|---|---|---|
| 1 | 5 | 10 | "NEW STRING 1" |
| 42 | 15 | 20 | "NEW STRING 36" |
| 1 | 23 | 15 | "NEW STRING 83" |
| | | | |

TARSTRING. LST

TRANSLATED RESULT

FIG. 8D

METHOD FOR AUTOMATIC DISPLAYING PROGRAM PRESENTATIONS IN DIFFERENT LANGUAGES

FIELD OF THE INVENTION

This invention relates generally to user interface messages, also referred to as presentations, herein defined to include commands, action key words, titles, status, inquiry and like messages generated from an application program to communicate with the user. More specifically the present invention relates to translation and other such altering programs used for displaying presentations to the user on a computer viewing screen, running in real time, often from target application programs utilizing a graphical user interface (GUI) operating in a personal computer or work station under an operating program platform like OS/2, Windows or UNIX. The target application program can be a text based application running in the pure text mode operating system platform, such as DOS, OS/2 and Unix. This type of application requires pre-formatted screens in which text is displayed.

BACKGROUND OF THIS INVENTION

Most GUI applications use a standard interface format and window structure which includes: menu bars, pull-down and pop-up windows, dialog boxes, buttons, message fields, etc. Although the application program determines the relative size and area of the screen locations and the text to be presented, the actual painting on the screen is controlled by the operating system. The text for such applications is normally implemented in one language which limits the usefulness of the application with users who do not have sufficient skills to understand the application's language. Prior solutions for this limitation include modifying the application program to present the text in another language, but this is a significant programming and technical task.

Other approaches have dealt with this challenge. Some solutions are application program specific, that is, some kind of language translation mechanism is built into the application program (such as in U.S. Pat. No. 4,731,735 to Borgendale er al.). Others require some type of message code (such as in U.S. Pat. No. 4,365,315 to Jamnik), or identifier (such as in U.S. Pat. No. 4,595,980 to Innes), so that computer specified messages can be generated and translated external to the application program in an interactive and real-time fashion. But, these approaches require that the identifying code be added into the application program itself. Such identifying requires that the application program itself be changed, and such changes are not amenable to on-line translation into many alternative languages. None has addressed an application program independent language translation process for presentations to be displayed, where the application program need not be recompiled or otherwise changed. Nor has there been any approach involving the learning process for a target application. Furthermore, there has not been any invention allowing the users to interactively change languages displayed while the application is running. Within this specification "target application" is defined as that application program whose user presentations are to be translated.

OBJECTS OF THE INVENTION

It is an object of this invention to provide a multi-language capability for the large inventory of single language off-the-shelf application programs that have accumulated over recent years.

Another important object of this invention is to provide the capability for a user to change the language in which a target application's user presentations, status and help messages, and static text such as menu items and commands are displayed. The user can change the display from an original language A to a second language B, chosen from a plurality of choices. Similarly, the user can use this invention to return to the original display in language A or continue to translate the display into a multiplicity of other languages. As designated and defined by the user, the translated language is applied to the presentation parts of the target application.

Another object of this invention is to allow a user to select and change the font of a displayed presentation.

Yet another object is to perform a similar type of translation on the operating system which controls the GUI environment.

Another object of this invention is to perform all the tasks stated herein without the need to recompile or modify either the target application program or the operating system in order to identify designated presentations for translation.

Another object of this invention is to perform the language translation on an application running on multiple computer systems which may have different operating platforms. In such a case the translation for each client can be tailored to both language and presentation font as the user(s) select.

SUMMARY OF THE INVENTION

The foregoing objects are met by a method for translating user interface presentations, in real-time, comprising the steps of: intercepting system messages, selecting a replacement language, replacing the presentation language with the replacement language while retaining the original presentation meaning. In addition, the method may further comprise the steps of selecting a plurality of other replacement languages, receiving an input from a user designating one of the selected replacement languages, and responsive to said input, replacing said presentation language with said designated language wherein the original message presentation is retained.

A preferred embodiment of the present invention provides a method for GUI applications of intercepting and monitoring systems calls and messages from the target application (herein application and application program are interchangeable) or a portion of a target application on a given platform (herein defined as the software operating program or equivalent control software) prior to submitting them to the operating system and routing them through a dynamic link library (DLL) or commercially available equivalent links. Another preferred embodiment of the present invention provides a method of intercepting and recognizing templates from the target application and substituting those intercepted with a corresponding template which contains a replacement language. In still another preferred embodiment in order to accomplish the translation during the real-time operation, two processes, a Learn process and a Run process are implemented.

The Learn process enables the user to identify the designated application output where the translation shall be performed. As a result of this process, an Application Specific Translation Table (ASTT) is built. The user or anyone who is familiar with the target application may then modify the translated words or phrases of the target application if the defaulted translation is not the most efficacious. This operation may be done by the user or anyone who is familiar with the application. When template recognition and translation is required an Application Specific Template Group (ASTG) is created during the Learn process also.

The Run process is the execution of the target application while the language translation is being performed in parallel. Should the user still disagree with the actual translation, the process can be halted, the application language database can be modified and the operation then resumed.

For example, in another preferred embodiment, if someone would like to translate the presentation of a target application, one can execute the Learn process with the application. First, the user identifies the displayable elements of the target application which are to be translated and the language into which it will be translated. Through this process the user can view the application screens both before and after translation. The user can also view the application specific translation table (ASTT) while the Learn process is running. If the default translation is not satisfactory, the user can substitute words or phrases in the ASTT by taking different selections or entering new words or phrases into ASTT.

After the ASTT is built, the user can start the Run process together with the target application. The application proceeds normally. All displays of the designated elements of the target application show in the translated language. The ASTT becomes the translation table for the Run process which enables the execution of the target application program in the designated language. Therefore, after the Learn process is complete for a target application, the Run process can be performed an unlimited number of times to change the target application's display into a plurality of different languages. In addition, the ASTT can still be modified if desirable during each Run process. If the ASTG is not required, the present invention allows a user to start the Run process before any Learn process. In this case, the Learn process intermixes with the Run process until the ASTT is built. Taking this approach to translate a target application's display takes more time, during the initial runs, than first executing the Learn process and then executing the Run process. Thus, increased calculation time notwithstanding, although the Learn and the Run processes are logically distinct, they do not have to be two separate operations. As detailed in a preferred embodiment the ASTG has to be built prior to the RUN process for a target application.

The foregoing and other objects, aspects and advantages of the invention will be better understood from the following detailed description of preferred embodiments with reference to the accompanying drawings, in which:

BRIEF DESCRIPTION OF THE DRAWINGS

FIG. 8C is a library of the original string coordinates and

FIG. 8D is a target string library which has the translated text.

DETAILED DESCRIPTION OF THE PREFERRED EMBODIMENTS

Figure 1:
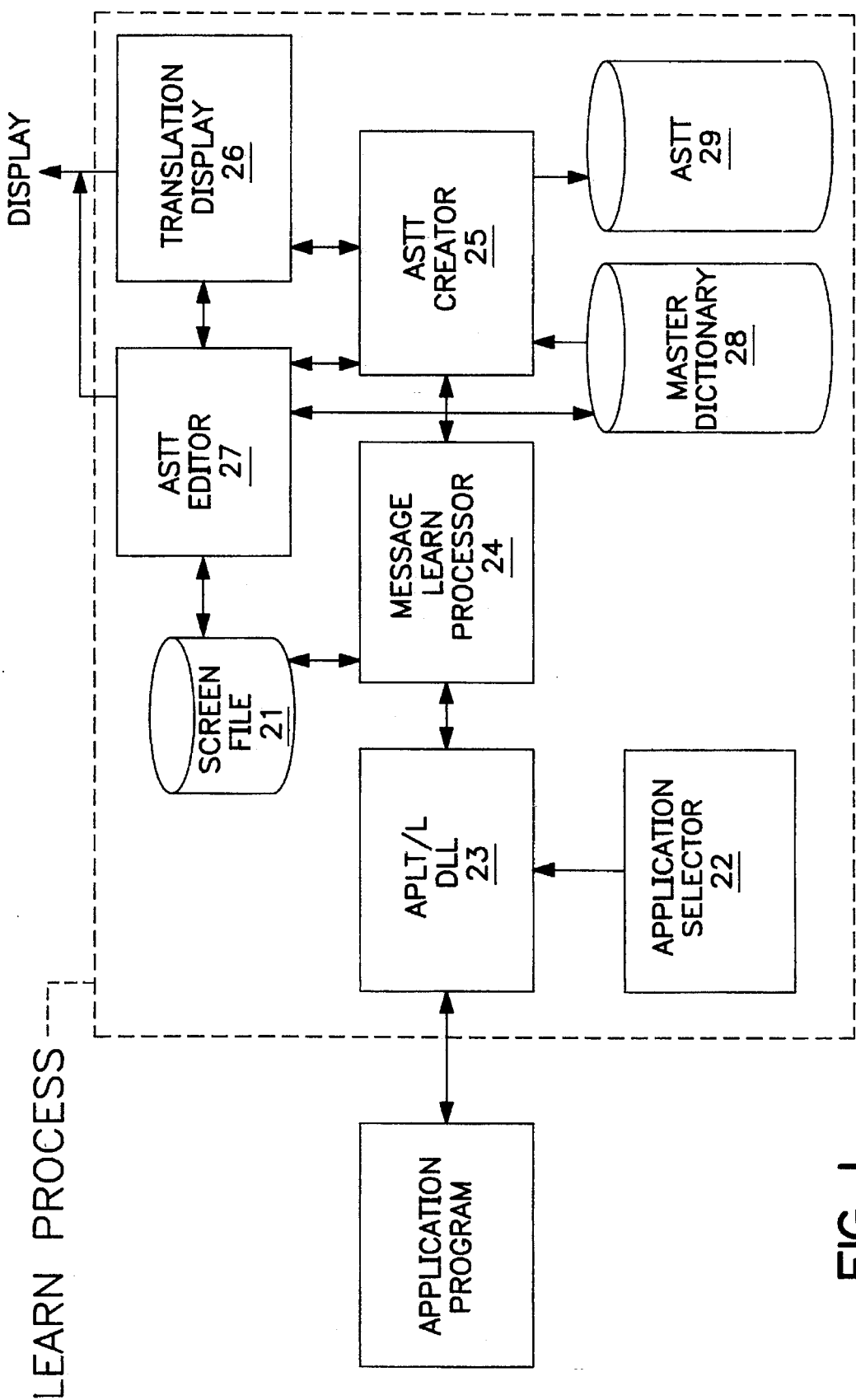
FIG. 1 is a block diagram illustrating the flow of the Learn process and the establishment of the ASTT table for a GUI application.

First we will describe the Learn Process, as illustrated in the block diagram, FIG. 1. An application program can be selected to be the target application where the translation will apply. The user may select an application using the mouse or similar pointing device to point to and click on the designated icon belonging to the target application or entering the name of the target application's .EXE or .CMD file (DOS file identifier extenders). The corresponding identification for the selected application is maintained in the Application Selector 22. The specific translation criteria, such as languages, fonts and whether the translation includes titles can be entered into Application Selector 22 also. When the designated application is being activated, the APLT/L Dynamic Link Library (DLL) 23 is injected into the application. All system messages are then monitored by the Message Learn Processor 24 which identifies message type in accordance with the translation criteria defined in the Application Selector 22 and stored in RAM. The Message Learn Processor 22 processes the pertinent message types and determines if there is a new or modified screen display which requires translation. Whenever a translation is deemed necessary, the Message Learn Processor 24 activates the ASTT Creator 25 which will perform the actual translation of a word or phrase. Another function of the Message Learn Processor 24 is to capture and store each screen before and after being translated in the Screen File 21. Each capture and translation process will create a separate file. Multiple files may be associated with a given application. The translation process will include looking up in the master dictionary 28. Herein, dictionary is defined as a listing of corresponding words, phrases, and simple sentences from different languages, with vocabulary for the original and the designated language. The words, phrases and sentences that are determined pertinent to the designated application are collected and placed in the Application Specific Translation Table (ASTT) 29. The translation process includes text extraction from window object and master dictionary lookups. When the translated text is found, it is applied back to the window object through Win API calls. During the translation process, the content of the ASTT 29 can be reviewed at any time. Should a user desire to make any changes to the ASTT, the edit process 27 can be performed. The edit process can change a translation or add words, phrases or sentences to an ASTT. After starting the APLT Editor 27, a file from the Screen File 21 must be chosen. This is accomplished by selecting 'open' from a pull down file menu. For an IBM OS/2 platform, Editor 27 contains routines that handle path information, read information on files in the current selected path and handle the actual opening of the file window. After the file is opened, Editor 27 also handles the control of the current, previous and next screens. For example, it handles the drop down combo box for choosing screens to view as well as the scroll up and scroll down buttons. It controls the reading of the data from the captured application screens. Display 28 is then activated to display the read in screen structures. For example, it creates a linked list of structures for displaying the details of the captured screens. It handles the setting up of data structures if a pulldown menu is to be displayed and displays the various window components. If further desirable, the screen before and after translation can be viewed simultaneously. Again, during the translation process, the ASTT can be modified utilizing ASTT Editor 27. This process can be accomplished by a routine which can be dispatched when the Dictionary pick is selected from the Option pulldown. A combo box is loaded with all the items in the dictionary, including those that were not translated on the current screen. The editor 27 supports Add/Change modes for the ASTT. After the ASTT is prepared, the APLT is ready to be applied to the designated application for real-time operation defined as the Run process.

Figure 2:
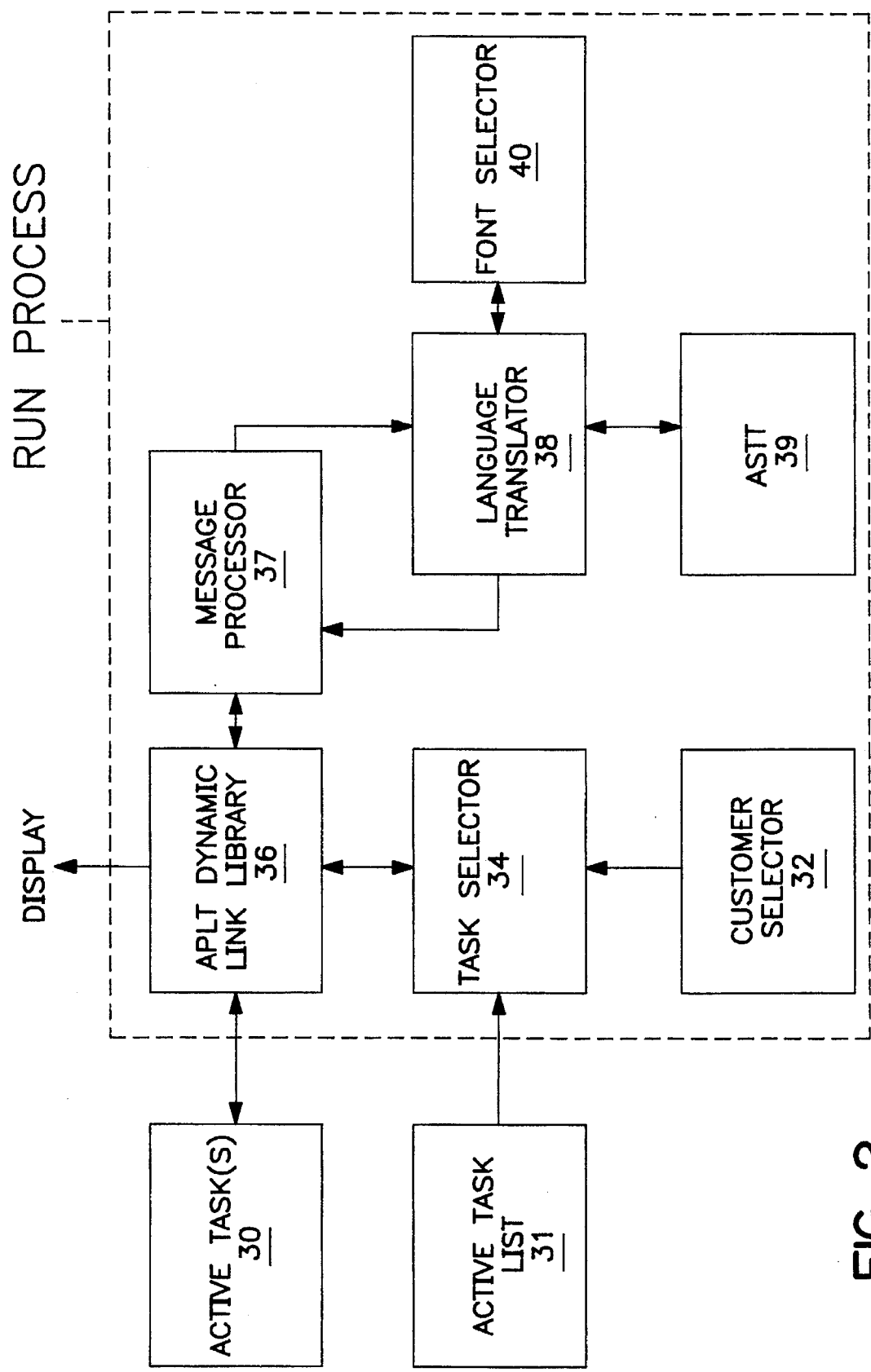
FIG. 2 is a block diagram illustrating the flow of the Run process for a GUI application that actually performs the translation while the target application is being executed.

The block diagram, FIG. 2 illustrates the Run process for a GUI application. There could be a number of active applications 30 running on the designated GUI platform defined as active tasks which could be any number of active tasks as permitted by the designated GUI platform. These are application programs a user can obtain or has obtained from any software vendor. There will not be any modifications made to either the source or object code of these applications in order to be processed by APLT. The identification of the active tasks 31 is listed at any given time. This list is maintained by the designated GUI operating system. The operator 32 selects the language and the designated applications where the language translation shall be performed. The selection 32 can be performed prior to or after an application becomes active. Based on these selections, the task selector 34 checks on the task list 31 and monitors the active tasks. When the designated task(s) 32 are detected, the task selector 34 shall notify and activate the APLT Dynamic Link Library (DLL) 36 which shall inject to those designated active tasks 30. For example, the injection may be accomplished by attaching a process or a thread to the designated active task. When screening through the system messages generated by designated active tasks 30, display related requests are processed by Message Processor 37.

Figure 3:
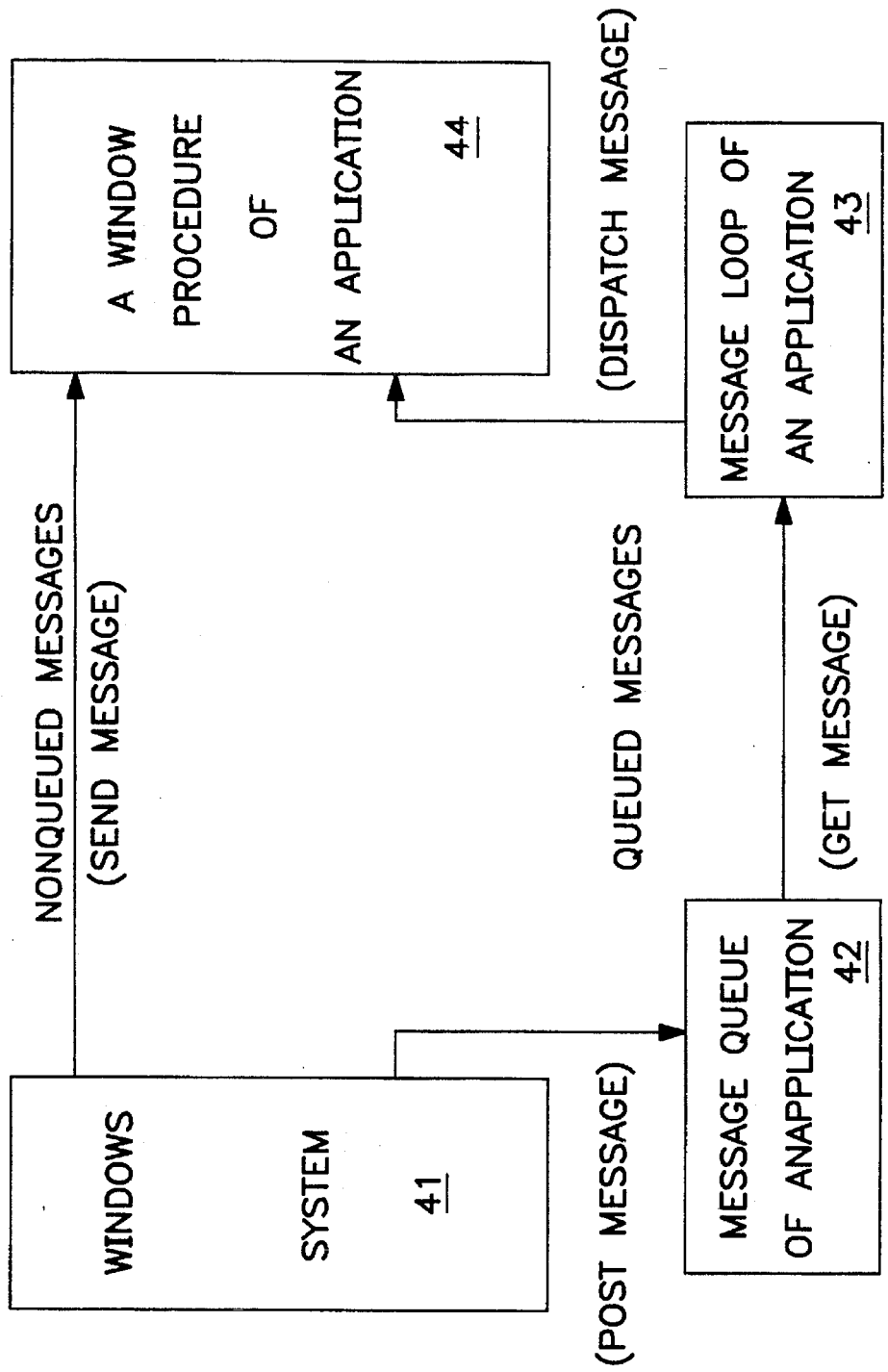
FIG. 3 is a block diagram the Message Processor.

FIG. 3 shows the message-driven Message Processor 37 in more detail under Microsoft Windows 41.

In the Windows operating system, messages are the input to an application. The messages represent events to which the application may need not respond. Messages can be either "queued" or "nonqueued". The "queued" messages are those that are placed in an application's message queue 42 by Windows 41 and retrieved and dispatched in the message loop 43. This means that the application has a message loop that retrieves messages from a message queue 42 by calling the GetMessage function and dispatches them to the window procedure 44 by calling the DispatchMessage function. Windows 41 places a message in an application's message queue by calling the PostMessage function.

The nonqueued messages are sent to the window directly by calling the SendMessage function when Windows calls the window procedure 44.

The result is that the window procedure 44 gets all the messages, including queued and nonqueued messages.

In order to translate text displayed on a screen, the text must be intercepted before Windows 41 displays the text. Since Windows 41 displays text, like menus or window captions, it sends some notification messages to the window procedure 44 of the application and provides a chance of the application to modify the text. For example, if a user selects a menu item, Windows 41 usually sends the main window procedure several different messages. The first message sent is a WM_SYSCOMMAND. The second message sent is a WM_INITMENU message. This message gives the user an opportunity to change the menu before it is displayed. Also, before any window caption is displayed, the window procedure 44 receives a WM_SHOWINDOW message.

If these messages that are related to the text are intercepted, a menu text or window caption text may be obtained by calling the Windows API function GetMenuString or GetWindowText. Then this text can be translated and restored by calling the Windows API function ModifyMenu or SetWindowText. Windows 41 will automatically display this translation on the screen.

Figure 4:
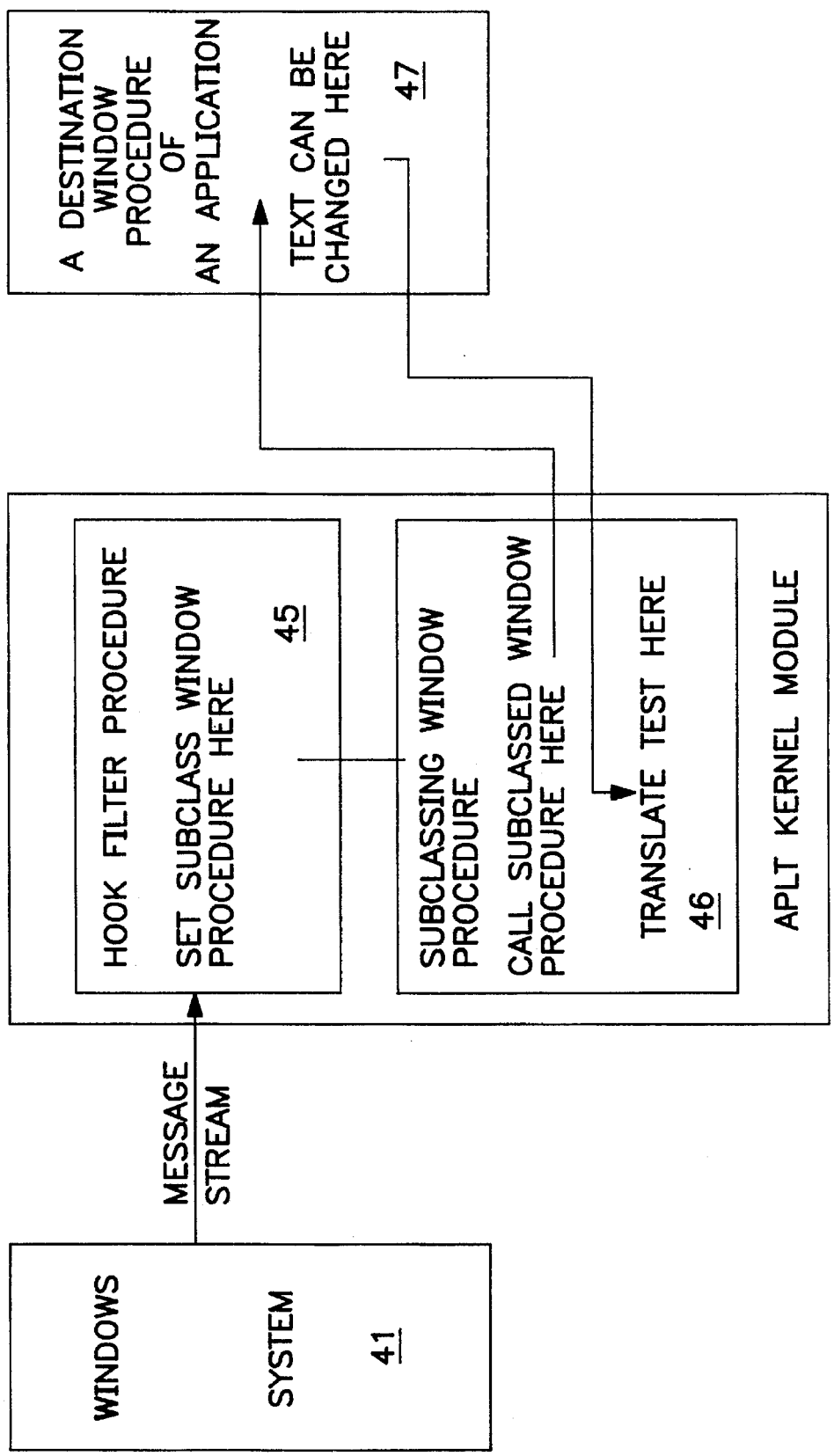
FIG. 4 is a block diagram of the APLT message processing.

The present invention uses message-processing based Windows techniques of hooks and window sub-classing and aims at capturing messages related to displaying text on screen before they reach the windows procedure. This technique is illustrated in FIG. 4.

By installing a window-procedure filter function (i.e. a hook filter function 45) for a designated active task or by replacing a window procedure 47 of the designated active task with a new window procedure which is defined in APLT (i.e. a subclassing window procedure 48), the message stream is accessed and all the messages are captured that are needed for translating before such messages reach the window procedure 47 of the designated active task.

Considering some destination window procedures 47 may do some work to change the text string, this embodiment translates the text after these changes have occurred. This means that the destination window procedure must be called and the call returned before we can translate the text. Windows 41 provides a specified function, CallWindowProc, to call the subclassed window procedure (i.e. the destination window procedure 47) within the subclassing window procedure 46 which is responsible for translating the text after the call is returned.

For example, we can translate the main menu of a designated active task even if the destination window procedure 47 does some work to change its main menu string. The following are the steps:

1. Install a hook filter procedure 45 for the active task and capture all the messages before they reach the destination window procedure 47;

2. When a WM_INITMENU message is intercepted in the hook filter procedure 45 a subclassing window procedure 46 which is provided by the APLT kernel module is installed to replace the destination window procedure 47. This means that the WM_INITMENU message will reach the subclassing window procedure 46, but not the destination window procedure 47 (i.e. the subclassed window procedure), and the subclassing window procedure 46 gets control of the designated active task.

3. When the WM_INITMENU message reaches the subclassing window procedure 46 we call the subclassed window procedure 47 by using a Windows 41 function, CallWindowProc, to allow the destination window procedure 47 to change the main menu.

4. When the CallWindowProc call returns, the subclassing window procedure 46 which has control of the active task gets the changed menu string by calling GetMenuString, translates the string and then restores this translation to the active task by calling ModifyMenu. The translated menu string is displayed on the screen by Windows system 41.

Referring back to FIG. 2, upon detecting that a translation is necessary, the Message Processor 37 shall activate the Language Translator 38. The translation is necessary if the first time a window is being painted since Message Processor 37 has been activated or the application has reset the window area. The Message Processor 37 constructs a structured storage area which reflect the layered windows painted by the designated application tasks. After the translation by the Language translator 38 is completed, the Message Processor 37 stores the replacement presentation as the current screen image in a structured storage area in RAM. When display related requests are again detected by the Message Processor, the Message Processor constructs the screen presentation image and compares it against the image stored in the structured storage area. The translation by the Language translator is performed on, and only on, the portions of the presentation where changes are detected. Subsequently, the image in the structured storage is updated to reflect the current. presentation. The steps designed herein prevent unnecessary translations. The actual translation is being done by the Language Translator 38 which translates words, phrases and sentences utilizing the ASTT tables. The language translator can also utilize the font tables to determine the actual font 40 to be painted on the screen. The font designation is especially important for multiple byte characters such as Chinese and Japanese.

In operation, an application while being executed, can be presented to the user in the original language the program was designed with or, if desired, in any language specified by the user. It is important to notice that this invention will handle the display of the designated application. It is not designed to handle the input translation from a user selected language to the language that the application is designed with. It should also be noticed that the Message Processor 37, the Language Translator 38 and the Translation Tables 39 can be configured on a separate processor. For example, these units can be implemented on a separate PC processor board. It should also be noticed that the translation table can be for the same language but with different expressions. The designated display of the application program can be determined by the user with total transparency from the executing applications.

The language translation logic can be a straight table look up or any of the many techniques known in the art.

Furthermore, the Language Translator 38 can also handle the data that remains constant (unchanged) in a client area of a GUI presentation. The client area is defined as a window area displayed by the application program which contains sections that allow a user to alter or enter data. The constant data in the client area are titles and descriptive information.

Figure 5:
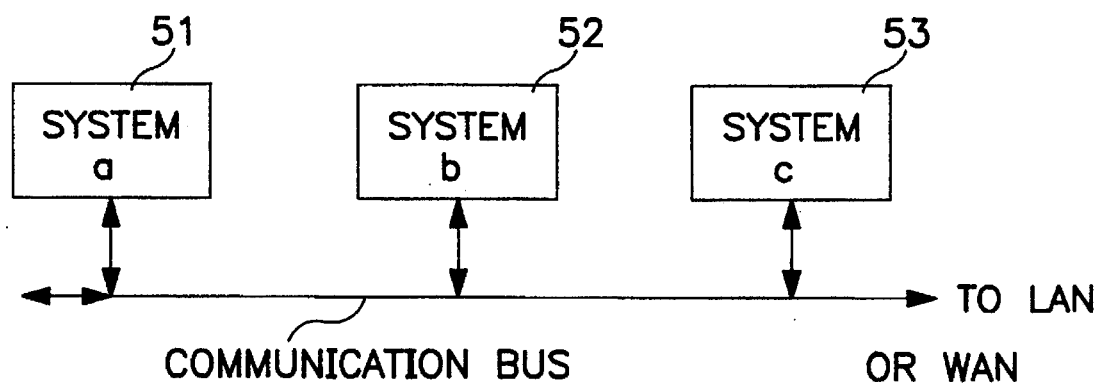
FIG. 5 is a block diagram illustrating a configuration of a multi-computer system application environment.

Referring to FIG. 5, for applications utilizing multiple computer systems, such as a client/server applications, which may be executing different platforms, the Learn and Run Processes can apply to each computer system where translation is required. If a language translation is needed on systems 51 through 53 (which are identical) and these systems have the same designated language, the Learn Process can be performed on one, for example system 53, and then the Run Process can be executed on all system, 51 through 53, using the same ASTT produced by the Learn Process. If some of the systems have different platforms or different designated languages, the Learn Process shall apply to each computer system having a distinct platform and/or language. In such a case a separate ASTT is produced for each of the distinct systems. The Run Process shall apply to each computer system where a language translation is required, using the corresponding ASTT created for the designated platform and language.

Figure 6:
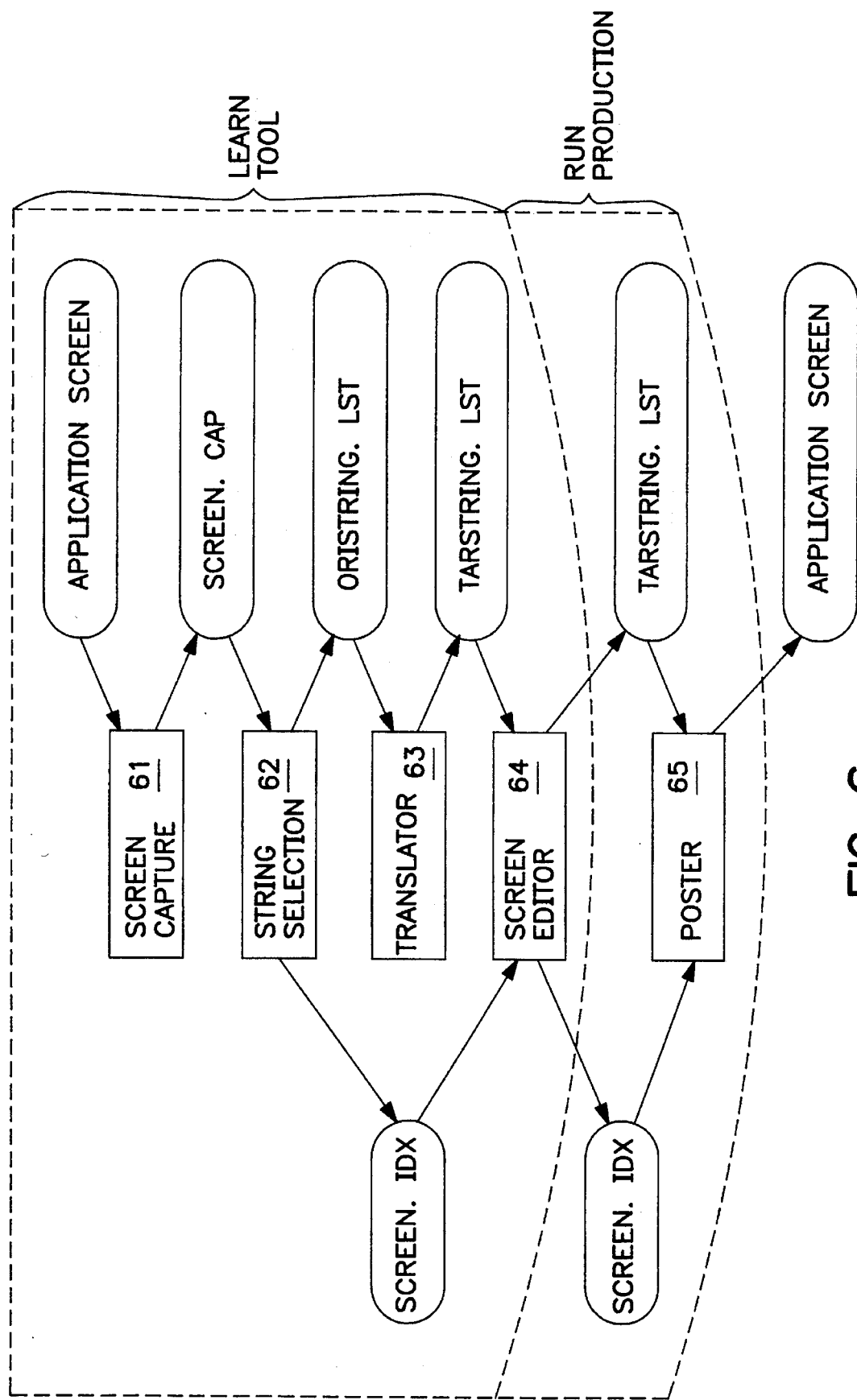
FIG. 6 is a flow/block diagram of the program flow.

FIG. 6 illustrates the translation process for a full screen, text based application, such as an MS DOS application. An application can be selected to be the target application for a designated a language and font, similar to the procedure defined for the above Application Selector 22. When the application is being activated, the Screen Capture Module 61 is activated by the user pressing a "hot" key. The "hot" key is defined herein as the button that initiates action. The Screen Capture Module 61 will be a memory resident program, such as a terminate-and-stay-resident (TSR) module under MS DOS. This module captures and saves all screens of the target application in SCREEN.CAP file. After all the screens are captured and saved in SCREEN.CAP, the next step is to activate String Selection Module 62. All character strings requiring translation are identified in this module. The character strings are stored in the ORISTRING.LST file and the associated pointers to the target screen in the SCREEN.IDX file. Then, the process moves to the Translator Module 63 where the actual translation is applied to the strings listed in the ORISTRING.LST file. The strings in the target language are stored in the TARSTRING-.LST file. After the TARSTRING.LST is built, the user can activate SCREEN Editor Module 64 to view and to make changes to the screens which have been translated. After the user finishes editing with Screen Editor 64, the Learn Process is completed and the real-time translation of the target application is now ready. The associated files, TARSTRING.LST and SCREEN.IDX are collectively defined as the Application Specific Template Group (ASTG).

After the ASTG is built, the designated translation occurs if the user activates the Poster Module 65 which will post the translated screen of the running application. Similar to the Screen Capture Module 61, the Poster Module 65 is a memory resident program, such as a TSR module under MS DOS.

Figure 7:
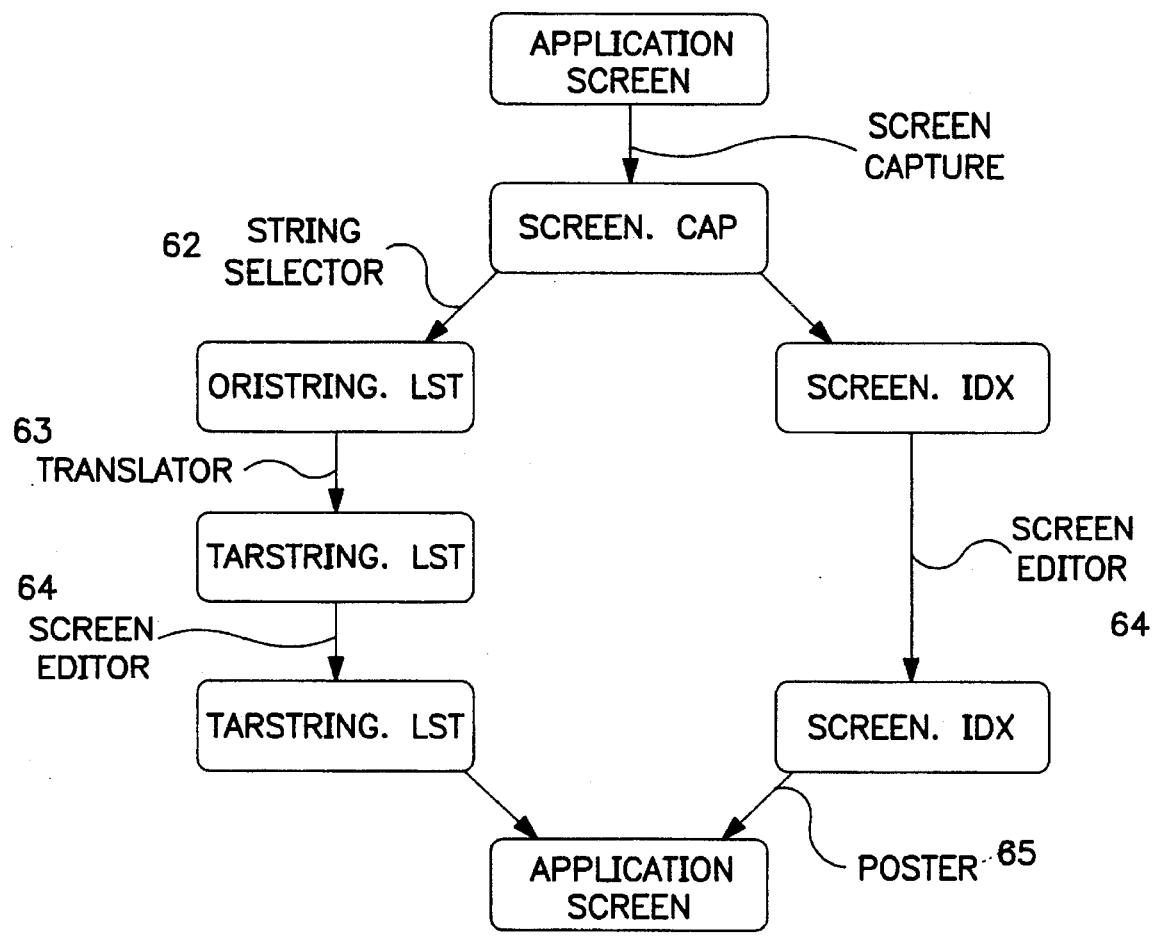
FIG. 7 is a flow/block diagram of the data stream/flow.

FIG. 7 delineates the data stream logic for FIG. 6. Table 1 describes the algorithm for modules 61 through 65. Table 2 outlines the structure of files required in these modules.

Referring to FIGS. 6 and 7 together. The Screen Capture 61 (as the title explains) captures screens of an application and outputs the data into a screen picture library called SCREEN.CAP. The steps to accomplish this are as follows:

1. Open SCREEN.CAP to save screen picture data;
2. TSR;
3. Execute the application by user;
4. Capture the screen to translated by the user pressing the capture hot key;
5. Write the screen information to SCREEN.CAP file;
6. Repeat step 4. until the application is complete;
7. Exit TSR program when user presses the exit hot key.

The String Selector 62 selects strings to be translated from the SCREEN.CAP (the screen picture library). The steps to accomplish this are as follows:

1. Open SCREEN.CAP to read the stored picture;
2. Open SCREEN.IDX to save screen index information;
3. Open ORISTRING.LST to save the original information of strings to be translated;
4. User declares a structure of screen index information and user declares a structure of original string information;
5. Display a screen picture;
6. User selects the screen index string which is added to the screen index information;
7. Add the location of the screen index string to the screen index information;
8. Find the tail of the ORISTRING.LST and add it to the screen index information;
9. Write the screen index information into SCREEN.IDX;

10. User selects the strings on the displayed screen to be translated and adds them into the original string with their text locations;
11. Write the original string into ORISTRING.LST;
12. Repeat steps 5–11 until the last screen picture has been processed.

The Translator 63 converts original string that is taken from the ORISTRING.LST, into target string in target language and stored in the TARSTRING.LST by the following steps:

1. Translate original string into target string using any commercially available translate tool;
2. Generate the TARSTRING.LST with the original string's location and target string location.

The Screen Editor 64 adjusts the target strings, taken from the TARSTRING.LST, onto the background of the original screen and stores such adjusted strings back into the TARSTRING.LST. The steps to accomplish this are as follows:

1. Open SCREEN.CAP to read the stored screen picture;
2. Open SCREEN.IDX to save screen index information;
3. Open TARSTRING.LST to edit the original information of the target strings;
4. Display a screen picture as background;
5. Read the information of the target strings and display them;
6. Adjust the information of target string on the screen interactively by user;
6.1 Select the string to be edited;
6.2 Move the selected string on to the viewing screen
6.3 Edit the text of the selected string
7. Write back the edited information of target string to TARSTRING.LST;
8. Repeat step 4–7 until last screen edited.

The Poster 65 posts the translated screen on the screen of the application by taking the target string library, TARSTRING.LST, and the Screen index library, SCREEN.IDX, and outputs (posts) the results on the application screen. The steps to accomplish this are as follows:

1. Open SCREEN.IDX to determine the screen picture;
2. Open TARSTRING.LST to read the information of the target strings;
3. TSR;
4. Execute the application by user;
5. Watch the application screen until a known screen appears, then go to next Step;
6. Read the information of target string from TARSTRING.LST according to the index in SCREEN.IDX:
7. Display such information from TARSTRING.LST and SCREEN.IDX on the application screen;
8. Repeat step 5–7 until application is finished:
9. Exit the TSR program by user pressing the exit hot key.

Figures 8A, 8B:
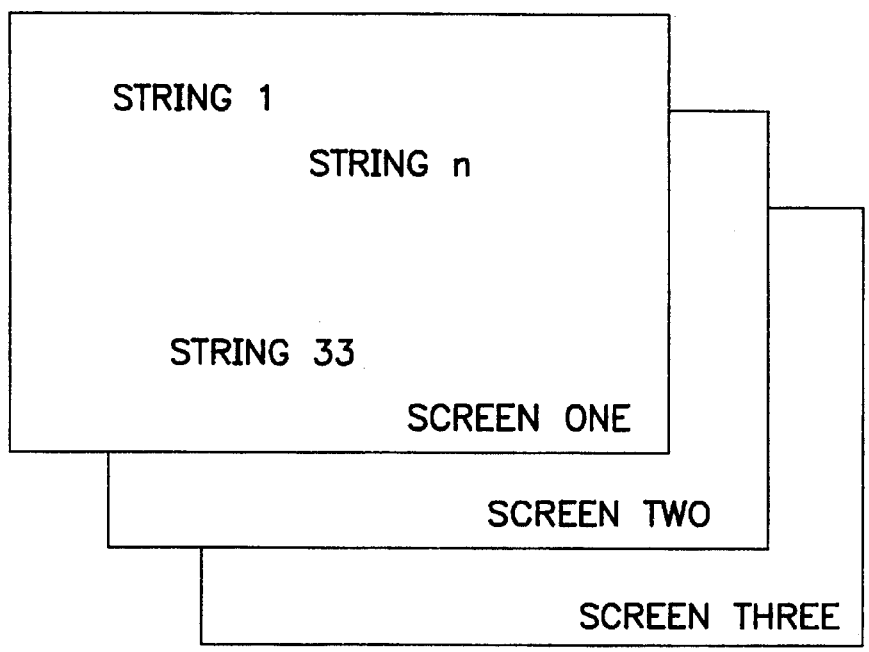
FIG. 8A is a pictorial screen image of the original data strings.
FIG. 8B is a screen index file.

FIG. 8A shows the original data strings as captured as essentially a screen image 8A and stored in SCREEN.CAP. In this example, there are thirty identified text strings on screen one. FIG. 8B shows a Screen Index Library file that is built that allows the system to know on which screen a particular text string is to be found. The x,y rectangular coordinates of start of a particular character string is stored in the columns labeled X and Y. In this example the viewable screen contains twenty-five lines of eighty characters each. The twenty-five being the y dimension, and the eighty being the x dimension. In the example given in FIGS. 8A and 8B a text string is indicated by "SCREEN 1" and starts at line twenty-three, character position sixty and is eight characters long. This string identifies the corresponding screen to be screen one. The Original String Library, shown in FIG. 8C, is built containing the x,y coordinates, the text character length, the actual text string itself and the index. In the example given the first thirty-three text strings are found on screen one and the strings thirty-four through seventy-seven are found and screen two, and so on. The Original String Library text strings are translated with the result stored in TARSTRING.LST, shown in FIG. 8D. This file has the same x,y coordinate position data as in the original data file but with the translated text. The Poster 65 will then display the translated text in the same position on the same screen where the original text would have resided.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. A general purpose computer implemented method for translating the original language of presentations of a target application program into a selected replacement language for display on a computer viewing screen, wherein the translation retains the original presentation meaning, comprising the steps of:

loading said target application program into a general purpose computer for running said target application program, storing a replacement language in said general purpose computer, said stored replacement language forming a database multi-language dictionary, injecting, into said loaded target application program, a program means utilizing a dynamic link library to attach a process to said target application program, running said target application program in said general purpose computer, recognizing, via said attached process, the application original presentation, and replacing said original language with said replacement language by using said original presentation as an entry into said dictionary wherein said recognizing and replacing occur in real-time.

2. A method as defined in claim 1 further comprising the steps of:

storing a plurality of other replacement languages via said dictionary, storing a presentation font in a computer database, receiving activities from the target application program, and recognizing, via said injected program means, that the activities contain said original presentations requested by the target application to be communicated to the user through the general purpose computer and replacing the presentation font with the selected font, and responsive to said activities, replacing said presentation language with said selected language.

3. A computer, having an operating system, implemented method for translating and altering the language of original presentations of target application programs into a selected replacement language with a selected replacement font comprising the steps of:

loading said target application programs into a general purpose computer for running said target application programs, storing a replacement language in said general purpose computer, said stored replacement language forming a database dictionary, storing a presentation replacement font in a computer database of fonts, injecting, into said loaded target application programs, a program means utilizing a dynamic link library to attach a process to said target application programs, running said target application program, receiving activities from said target application programs, and recognizing, via said attached process, that the activities contain original presentations requested by said target application programs to be communicated to the user through the operating system, and storing the designated replacement presentation with the selected replacement language and the selected replacement font corresponding to said original presentation language and font.

4. A method as defined in claim 3 further comprising the following steps of:

f) capturing said received original presentations from the target application programs by installing a window procedure filter function before the original presentations are displayed by said operating system, and g) sending the stored designated replacement presentation to the operating system for display to the user, wherein said translation process occurs in real-time to said user.

5. A method as defined in claim 3, wherein said selected replacement language and selected replacement font constitute an application specific translation table, further comprising the following steps:

a) providing a master dictionary file stored as a computer database of selected replacements languages, b) comparing the received presentation with the stored identified target presentations to determine if a received presentation is to be translated and into what language, c) looking up, via computer means in the master dictionary computer database the original received presentations and replacing the original presentations with corresponding translated presentations, d) storing in computer memory corresponding words and phrases of the original translated presentations in an application specific translation table, and e) repeating the process for each selected language.

6. The method of claim 3 further comprising the steps of displaying the translation to the user, and accepting inputs from the user to correct said translation.

7. The method of claims 3, 4 or 5 further comprising the steps of stopping and displaying each step to said user.

8. The method of claims 3, 4 or 5 wherein said steps of claims 3, 4 or 5 are repeated for multiple languages and for concurrently active applications.

9. The method of claims 3, 4 or 5 further comprising the step of editing of said translation tables.

10. The method of claims 3, 4 or 5 further comprising the step of selecting a different presentation language during execution of an application.

11. The method of claims 3, 4 or 5 further comprising the steps of: running an application on multiple computer systems and platforms, and activating the translations for a plurality of replacements languages and replacement fonts individually on each computer system and platform.

12. A method as defined in claim 3 further comprising the step of preventing the original presentation from being sent to the operating system.

13. A method as defined in claim 3 further comprising the step of allowing the original presentation to be sent to the operating system, and immediately overwriting said original presentation with the replacement presentation such that the user does not see the original presentation.

14. Computer apparatus for translating the language of original presentations of a target application program into a selected replacement language for display on a computer viewing screen, wherein the translation retains the original presentation meaning, comprising:

a general purpose computer loaded with the target application program in runable form, means for storing a replacement language in said general purpose computer database multi-language dictionary, means for injecting into the loaded target application program a program means utilizing a dynamic link library to attach a process to said target application program, means for running said target application program, means for recognizing, via said attached process, the application original presentations means for replacing said language of said original presentations with said replacement language by looking up translations via said dictionary and wherein said recognizing and replacing occur in real-time.

15. Computer apparatus, having an operating system, for translating and altering the original presentation language of target application programs into a selected replacement language of a selected font comprising:

a general purpose computer loaded with the target application programs in runable form, means for storing a replacement language in said general purpose computer database multi-language dictionary, means for storing a presentation font in said general purpose computer database of fonts, mean for injecting into the loaded target application programs a program means utilizing a dynamic link library to attach a process to said target application program, such that the original presentation is not sent to the operating system, means for running said target application programs, means for receiving activities from the target application programs, and recognizing, via said attached process, that the activities contain original presentations requested by the target application programs to be communicated to the user through the operating system, and means for replacing the original presentation and font with the selected replacement presentation via said dictionary and font database.

* * * * *